US012600068B2

(12) United States Patent
Redmon et al.

(10) Patent No.: US 12,600,068 B2
(45) Date of Patent: Apr. 14, 2026

(54) INTEGRATED PRESSURE SENSING OF FILTERED MOLTEN MATERIAL

(71) Applicant: THE PROCTER & GAMBLE COMPANY, Cincinnati, OH (US)

(72) Inventors: Tyra Ray Redmon, Manchester, OH (US); Robert Lewis Ritchie, Warsaw, IN (US)

(73) Assignee: The Procter & Gamble Company, Cincinnati, OH (US)

( * ) Notice: Subject to any disclaimer, the term of this patent is extended or adjusted under 35 U.S.C. 154(b) by 47 days.

(21) Appl. No.: 18/653,503

(22) Filed: May 2, 2024

(65) Prior Publication Data

US 2024/0391149 A1 Nov. 28, 2024

Related U.S. Application Data

(60) Provisional application No. 63/468,737, filed on May 24, 2023.

(51) Int. Cl.
B29C 45/24 (2006.01)
B29C 45/77 (2006.01)

(52) U.S. Cl.
CPC .............. B29C 45/24 (2013.01); B29C 45/77 (2013.01)

(58) Field of Classification Search
CPC ................................ B29C 45/24; B29C 45/77
USPC ........................................................ 425/84
See application file for complete search history.

(56) References Cited

U.S. PATENT DOCUMENTS

| | | | |
|---|---|---|---|
| 4,906,360 A * | 3/1990 | Trakas ................. | B01D 29/925 |
| | | | 425/84 |
| 5,385,462 A | 1/1995 | Kodama et al. | |
| 10,226,885 B2 | 3/2019 | Debruin et al. | |
| 10,737,420 B2 | 8/2020 | Debruin et al. | |
| 2017/0259479 A1 | 9/2017 | Debruin et al. | |
| 2019/0366607 A1 * | 12/2019 | Lawless, III ........ | B29C 45/1732 |

FOREIGN PATENT DOCUMENTS

| | | | |
|---|---|---|---|
| DE | 4237174 A1 | 5/1994 | |
| EP | 0163614 A2 * | 12/1985 | ............. B29C 45/24 |
| JP | S6143532 A | 3/1986 | |
| JP | H057423 U | 2/1993 | |
| JP | H06293050 A | 10/1994 | |
| JP | H11170320 A | 6/1999 | |
| JP | 2000061605 A | 2/2000 | |

OTHER PUBLICATIONS

EMI® Catalog—Injection Molding Supplies—Linear Edge Filter https://catalogs.emicorp.com/Injection-Molding-Supplies/50/ (Understood to be publicly available before Jan. 1, 2023).

* cited by examiner

*Primary Examiner* — Abbas Rashid
*Assistant Examiner* — Gregory C. Grosso
(74) *Attorney, Agent, or Firm* — George H. Leal

(57) ABSTRACT

A molten material processing control system, such as a plastic injection molding system, is provided with a pressure sensor, such as a melt pressure transducer, in fluid communication with filtered molten material, thereby ensuring the molten material to which the pressure sensor is exposed is free from inconsistencies, impurities, unmelted plastic pellets, or other debris. In one embodiment, the filter is a linear edge nozzle filter and a pressure sensor is disposed in fluid communication with an exit groove thereof. In another embodiment, the filter is a disc-shaped tramp filter and the pressure sensor is disposed downstream of the filter.

7 Claims, 18 Drawing Sheets

INTEGRATED PRESSURE SENSING OF FILTERED MOLTEN MATERIAL

CROSS-REFERENCE TO RELATED APPLICATION

This application claims the benefit under 35 U.S.C. § 119(e) of U.S. Provisional Patent Application No. 63/468, 737, filed May 24, 2023, and the entire disclosure thereof is hereby incorporated by reference.

FIELD OF THE DISCLOSURE

This disclosure relates generally to improving the accuracy of control of manufacturing equipment used in the production of products using molten polymeric materials, and more specifically, to configurations for filter packs of closed-loop plastic processing control systems, such as injection molding systems, that accommodate pressure sensing of filtered melt.

BACKGROUND

Injection molding systems and other closed-loop plastic processing systems typically use hydraulic pressure or data from load cells associated with a barrel upstream of a nozzle and mold cavity. In an effort to improve homogenization and reduce impurities in molten polymeric and other materials used in injection molding, so as to reduce blockage of feed channels or hot runners minimize damage to gates, it is desirable to employ filters, such as linear edge filters, immediately upstream of the nozzle.

A linear edge filter, such as the F1 or F2 Linear Edge Nozzle Filter available from the PCS Company, Fraser, Michigan, is generally cylindrical in shape, and has a plurality of alternating, axially-extending flutes or grooves along its exterior. A first set of the alternating flutes or grooves are open to, i.e. are in direct communication with, an upstream end of the filter (or accept incoming melt from infeed ports that are open to an upstream end of the filter). The grooves of this first set are referred to as rear-ported grooves. A second set of the alternating flutes or grooves are open to, i.e., in direct communication with, a downstream end of the filter (or flow into outlet ports that are open at a downstream end of the filter). The grooves of this second set are referred to as front-ported grooves. The linear edge filter is received in a complementary filter bore of a nozzle body that is in fluid communication with a barrel of an injection molding system. The linear edge filter may be secured in place within the filter receptacle by a locating washer, and a nozzle is secured, such as with a threaded connection, downstream of the filter. Alternatively, the nozzle tip itself can secure the linear edge filter within the filter bore of the nozzle body. A slight clearance, such as in a range of 0.001" to 0.01", between an outer diameter of the linear edge filter and an interior wall of the filter receptacle region of the nozzle body permits melt to pass from the first set of the alternating flutes to the second set of alternating flutes, while minimizing discontinuities and filtering unwanted irregularities, unmelted pellets, or debris from the melt between the barrier walls separating the flutes, and the interior wall of the filter bore of the nozzle body, before the melt enters the nozzle to be introduced into the mold cavity.

Another type of filter that may be used in conjunction with nozzles of injection molding machines is a disc-shaped tramp material filter plate, such as the filter plate of the Tramp Material Filter Nozzle, part number U-TF, available from EMI, Wickliffe, Ohio, which employs a multiplicity of small diameter (e.g., 0.32") filter plate holes through which melt must pass to reach the nozzle.

Either type of filter system necessarily introduces some drop in pressure from the location in the barrel where pressure sensing typically occurs and the location downstream of the filter where the melt passes through the nozzle. This pressure drop can adversely affect the accuracy of pressure readings on the basis of which adjustments are made to control a given shot on the injection molding machine. Moreover, as debris builds up on or in a filter, the pressure differential upstream and downstream of the filter tends to increase in an unpredictable way. It would be desirable to provide a manner of obtaining accurate pressure data as to filtered molten material. It would also be desirable to provide a filter pack that would be easy to disassemble from a barrel in a manner that facilitates quick filter changes without compromising the integrity of sensitive equipment that may be associated with a nozzle body in order to obtain accurate pressure data of such filtered molten material.

SUMMARY OF THE DISCLOSURE

By positioning a pressure sensor, such as a melt pressure transducer, in intimate contact with molten polymeric material upstream of a nozzle but downstream of a filtration barrier, superior pressure data may be obtained as to the molten polymeric material just as it is about to be introduced through the nozzle and into one or more mold cavities of a closed-loop plastic processing control system, such as an injection molding machine. In so locating the pressure sensor, the closed-loop system response is based on data indicative of pressure changes in the actual plastic material flowing through the nozzle and into one or more mold cavities, without errors resulting from un-sensed pressure changes, or transient disruptions, from changing conditions in filter flow due to the accumulation of tramp material or debris. That superior pressure data may, in turn, be used in making adjustments in the control of the injection molding machine, so as to avoid flash and other adverse consequences of controlling without accurately taking into account pressure differential between sensed hydraulic pressure or load cell data upstream of a filter and filtered molten material passing into and through the nozzle.

In a first embodiment of the present disclosure, a nozzle pack is provided in a manner so that a linear edge filter is disposed in a filter bore of a nozzle body in such an orientation that one of the second set of flutes or grooves of the linear edge filter, i.e., one of the alternating flutes or grooves in direct communication with outlet ports that are open at a downstream end of the filter (nearest a nozzle secured in the nozzle pack), is in direct fluid communication with a tip of a pressure sensor, such as a melt pressure transducer. In this manner, the pressure sensor is positioned to sense pressure downstream of the filter barrier, thereby obtaining real time, accurate melt pressure just as it enters the nozzle. By mounting the pressure sensor in this location, allows a closed-loop plastic processing control system, such as an injection molding system, to maintain a response time of less than 5 milliseconds (ms) upon changes in plastic pressure. The melt pressure transducer is mounted in such a manner that the nozzle and linear edge filter can be easily removed for cleaning or replacement of the linear edge filter.

In an alternate embodiment, a disc-shaped tramp filter is mounted in a complementary disc-receiving filter bore of an end cap adapter secured to an upstream (barrel-facing) end of a nozzle body. A melt pressure transducer is mounted in the end cap adapter so as to have its sensing tip exposed to melt entering the nozzle body downstream of the disc-shaped tramp filter. The assembly allows easy access to the disc-shaped tramp filter and interior of the end cap adapter for cleaning and filter replacement, without disturbing the mounting of the melt pressure transducer.

DETAILED DESCRIPTION OF THE PREFERRED EMBODIMENTS

Figure 1:
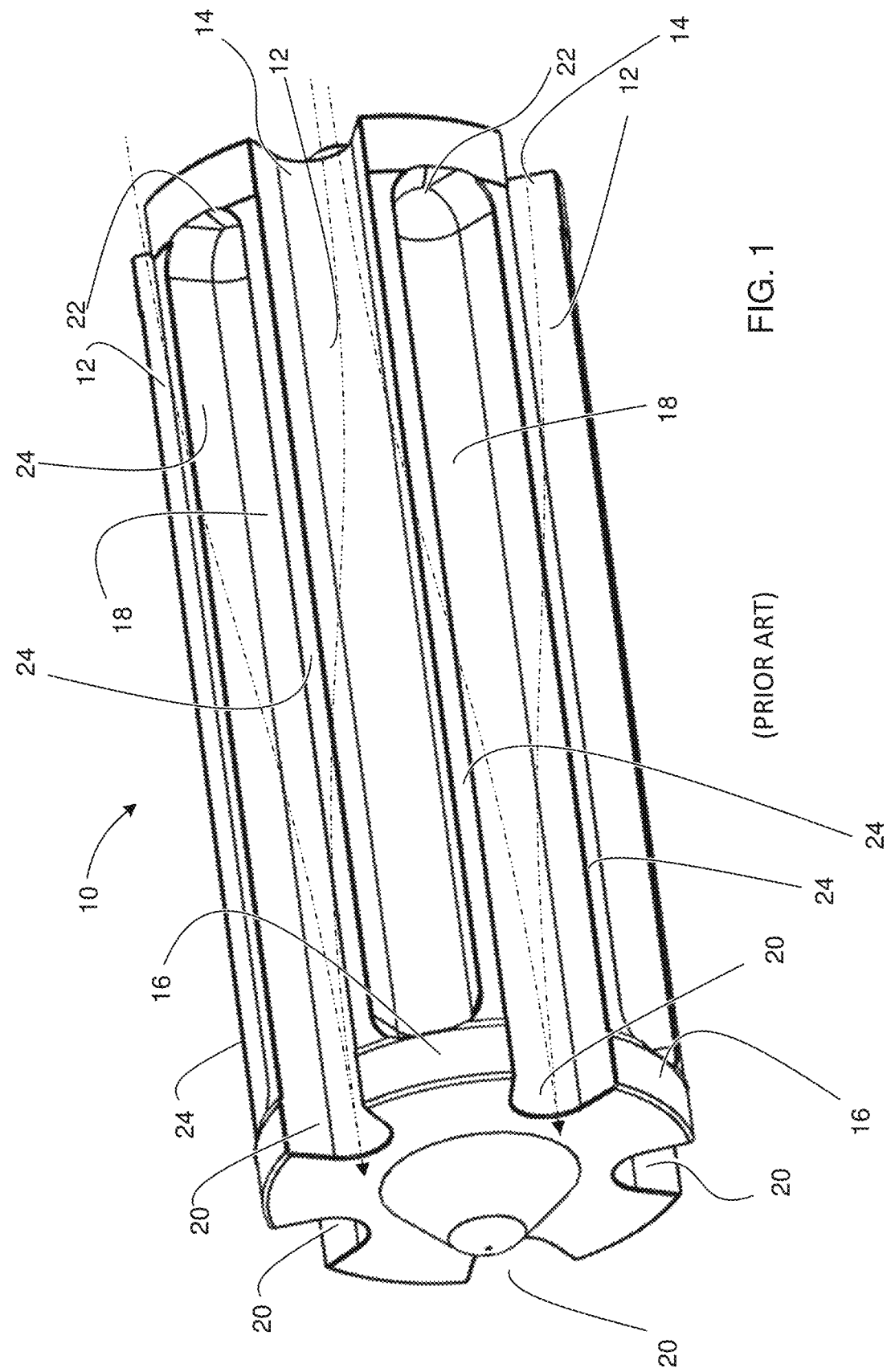
FIG. 1 is a right, top, front perspective view of a conventional linear edge nozzle filter.
Figure 13:
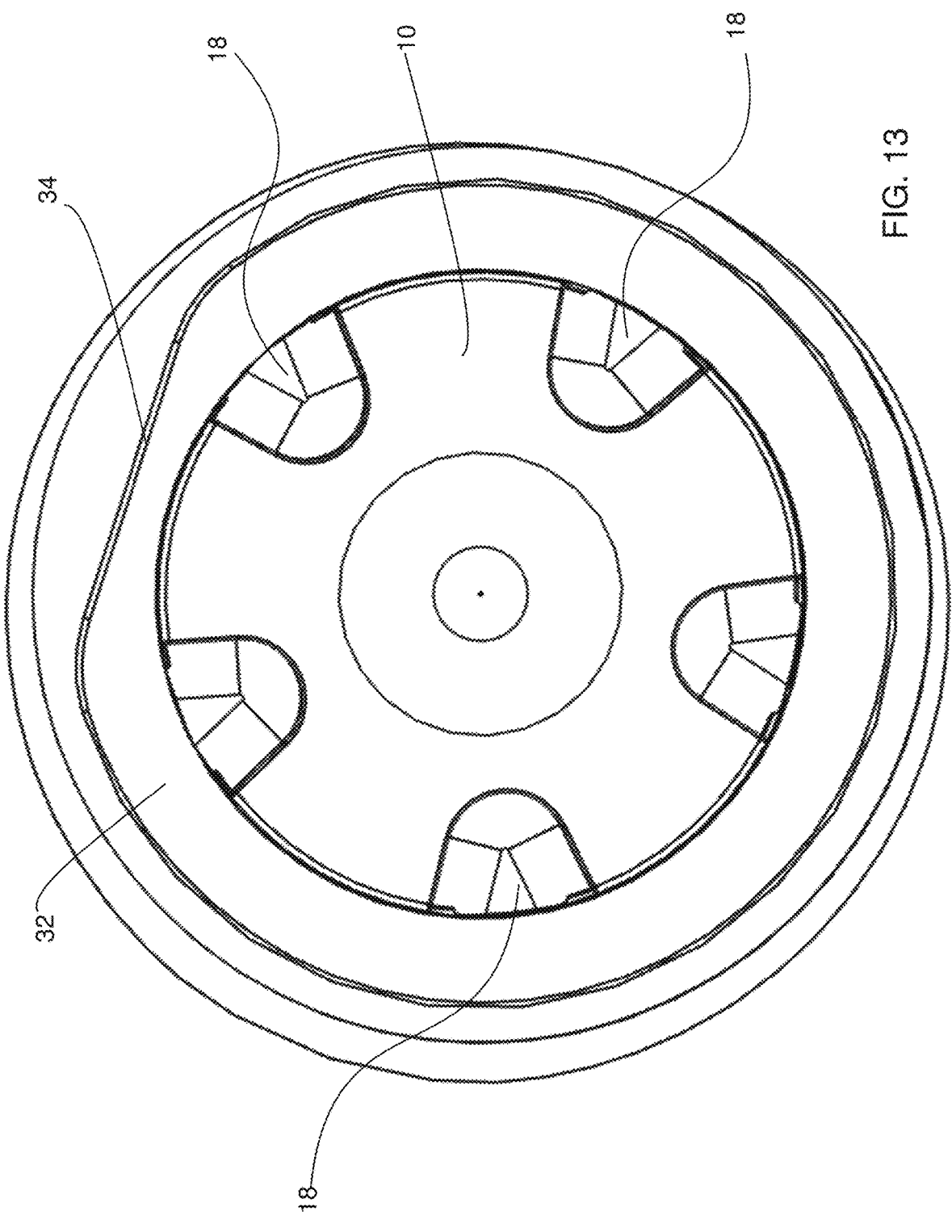
FIG. 13 is a perspective cross-sectional view of the linear edge nozzle filter illustrated in FIG. 1 mounted in a complementary filter-receiving bore of a nozzle body, with portions of the nozzle body removed for clarity.
Figure 13:
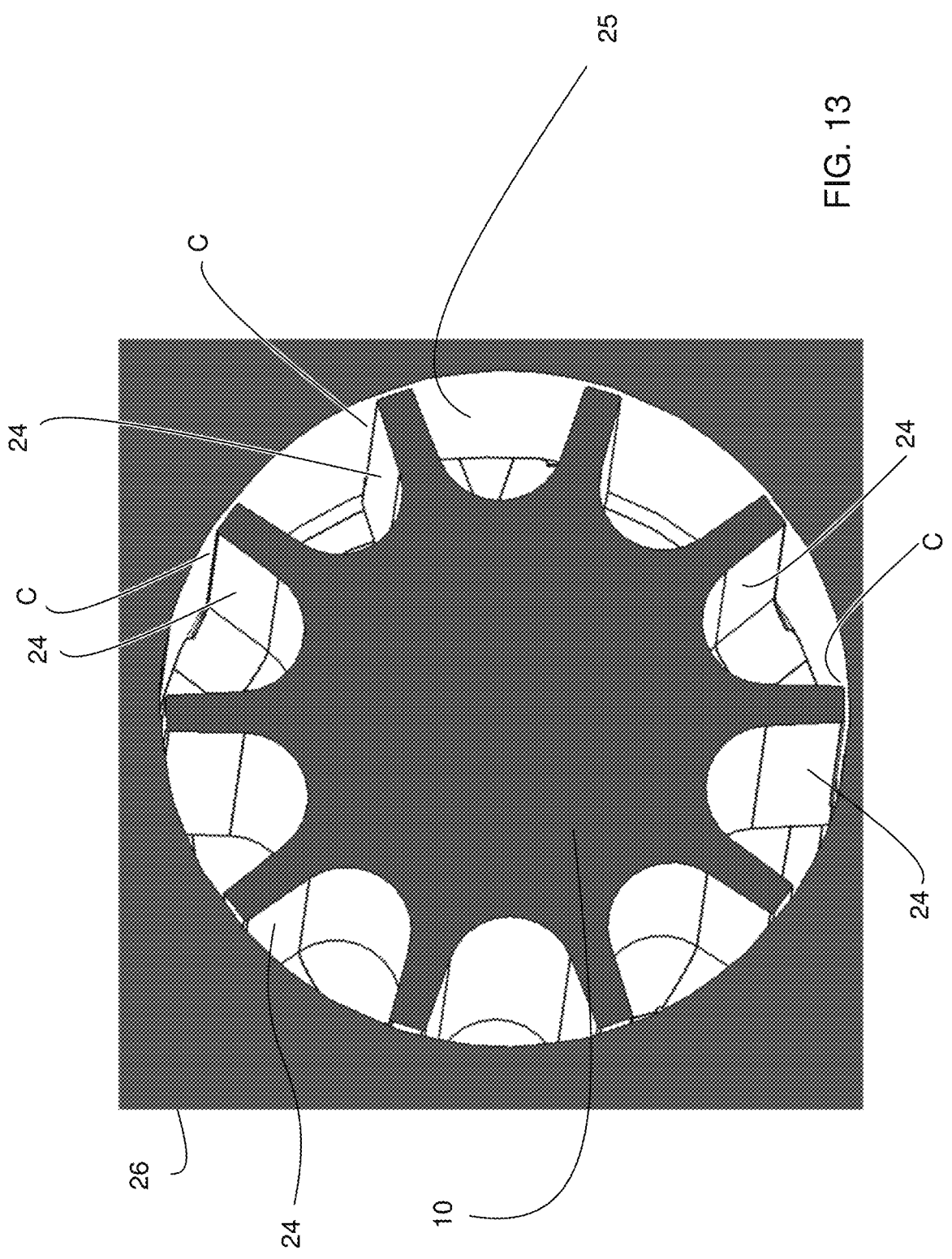
Figure 14:
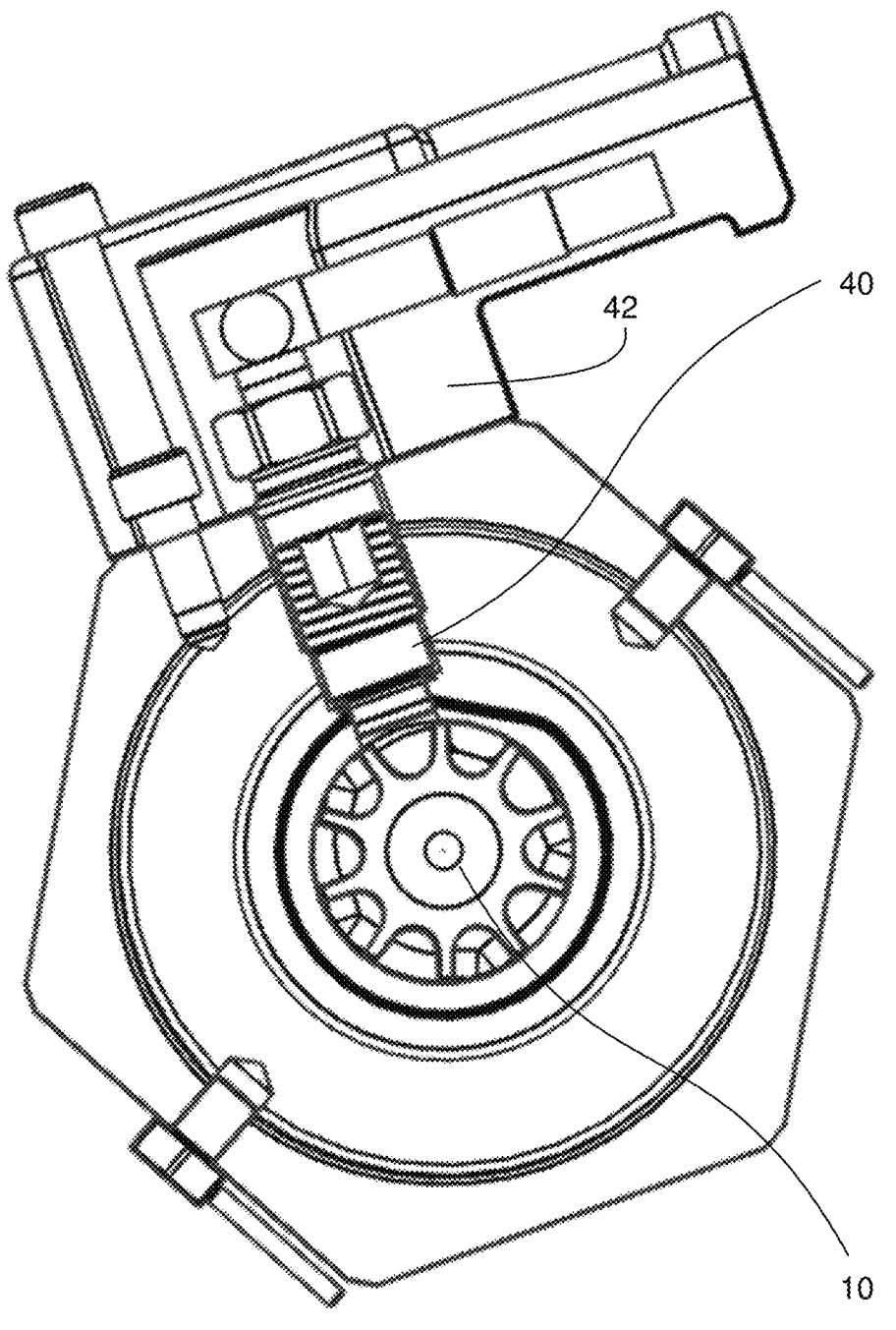
FIG. 14 is a cross-sectional view of the nozzle body, melt pressure transducer mounting assembly, linear edge nozzle filter, and locating washer, taken along lines 14-14 of FIG. 12.
Figure 15:
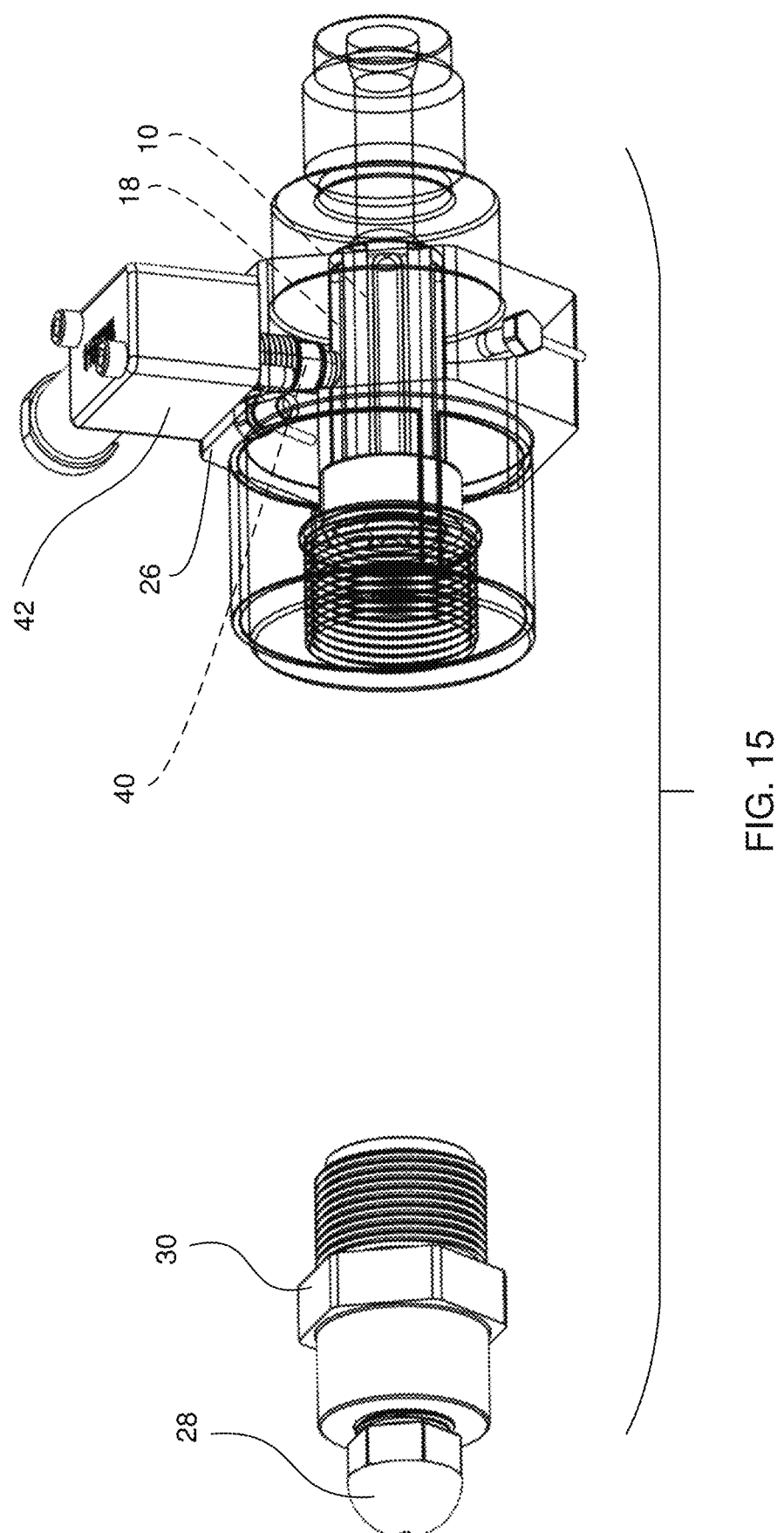
FIG. 15 is a front, right, top perspective view of a nozzle tip, filter cap, nozzle body, linear edge nozzle filter, locating washer, and melt pressure transducer mounting assembly, with portions of the nozzle body made transparent for clarity.
Figure 16:
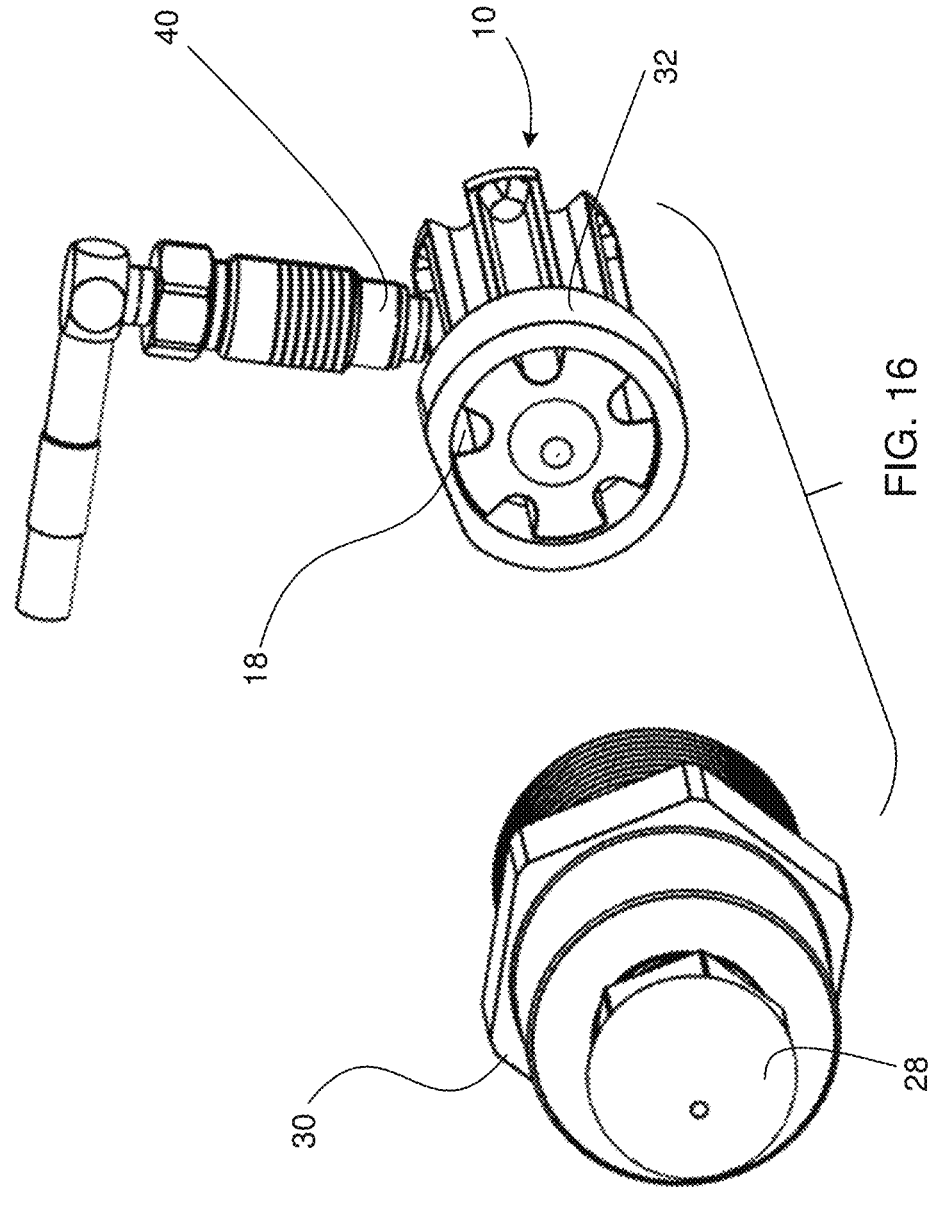
FIG. 16, is a front, right, top perspective view of a nozzle tip, filter cap, linear edge nozzle filter, locating washer, and melt pressure transducer mounting assembly.
Figure 17:
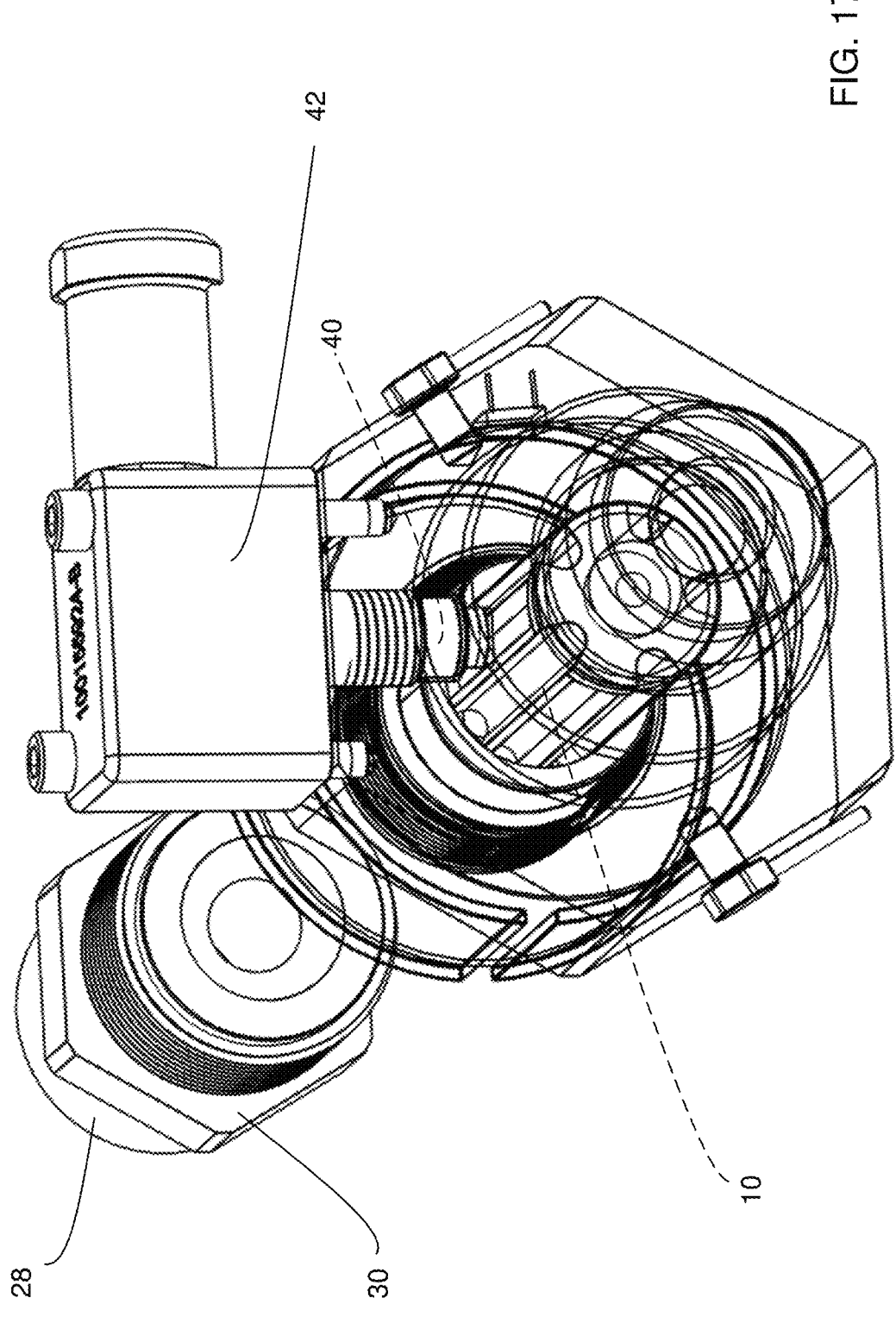
FIG. 17 is a rear, left, top perspective view of a nozzle tip, filter cap, nozzle body, linear edge nozzle filter, locating washer, and melt pressure transducer mounting assembly, with portions of the nozzle body made transparent for clarity.
Figure 18:
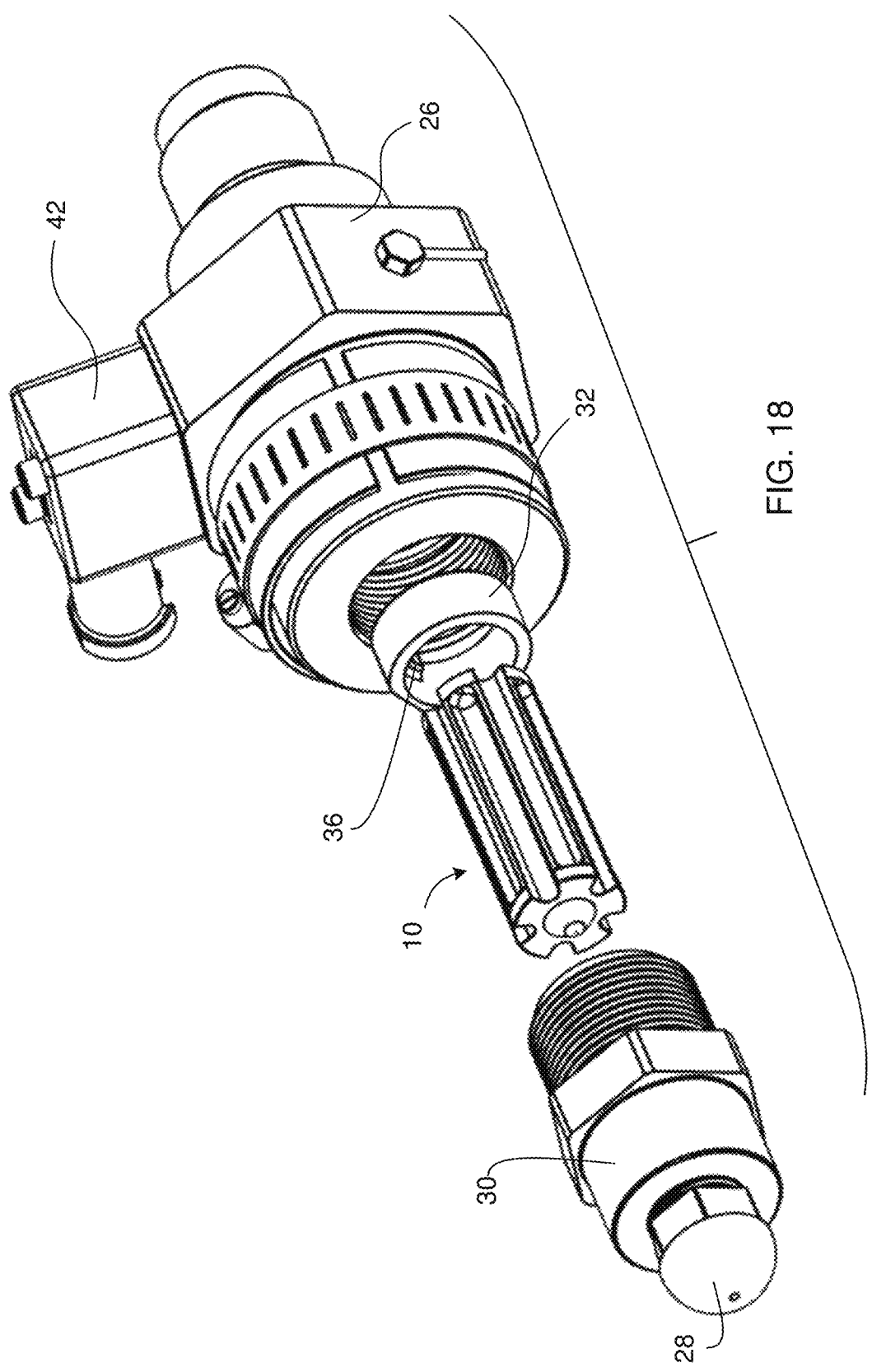
FIG. 18 is a partially exploded view of a nozzle tip, filter cap, nozzle body, linear edge nozzle filter, locating washer, and melt pressure transducer mounting assembly.
Figure 19:
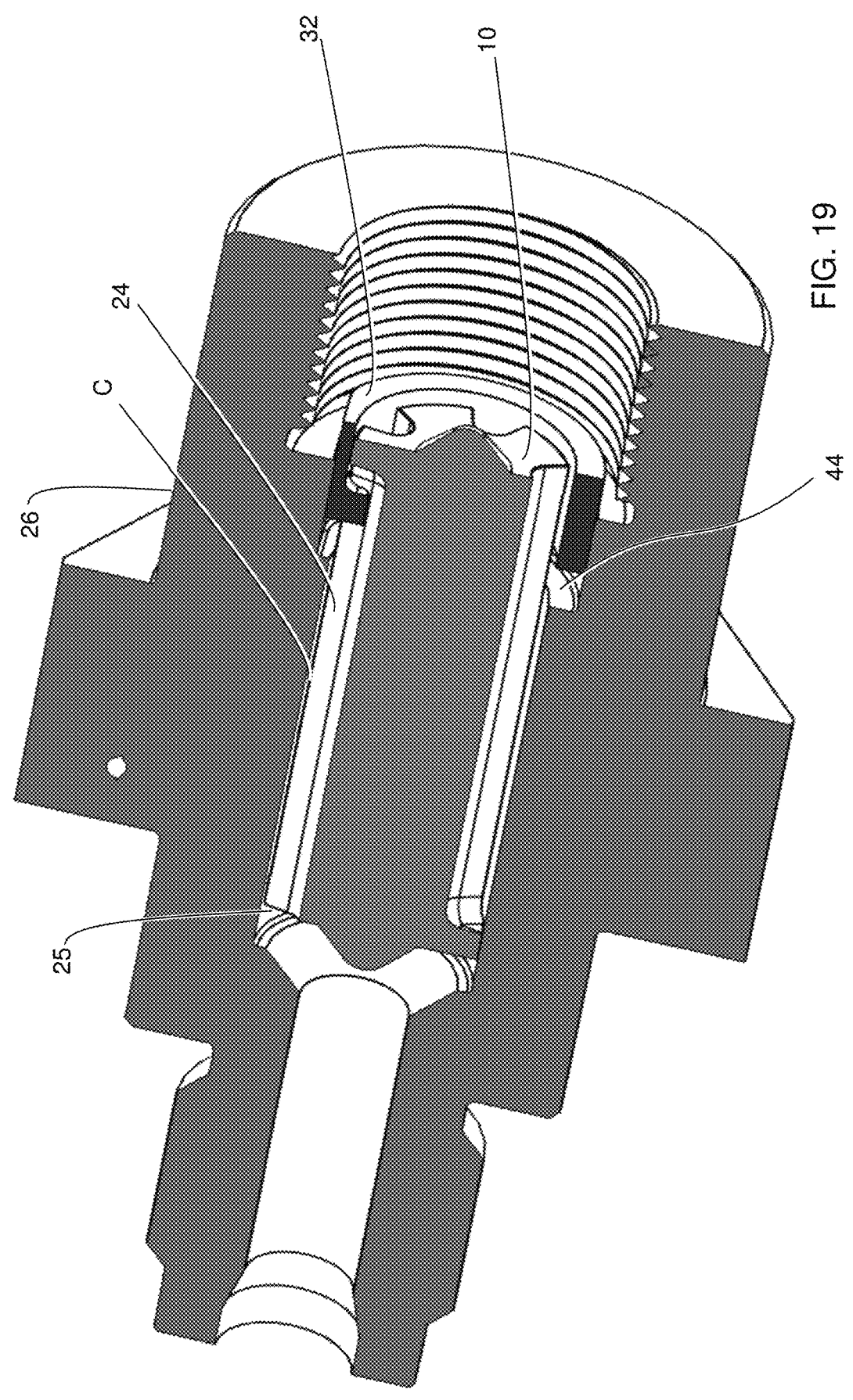
FIG. 19 is a slightly-exploded cross-sectional view illustrating an interior of a nozzle body having a nozzle bore and a washer seat, with a linear edge nozzle filter and locating washer almost fully seated therein.
Figure 20:
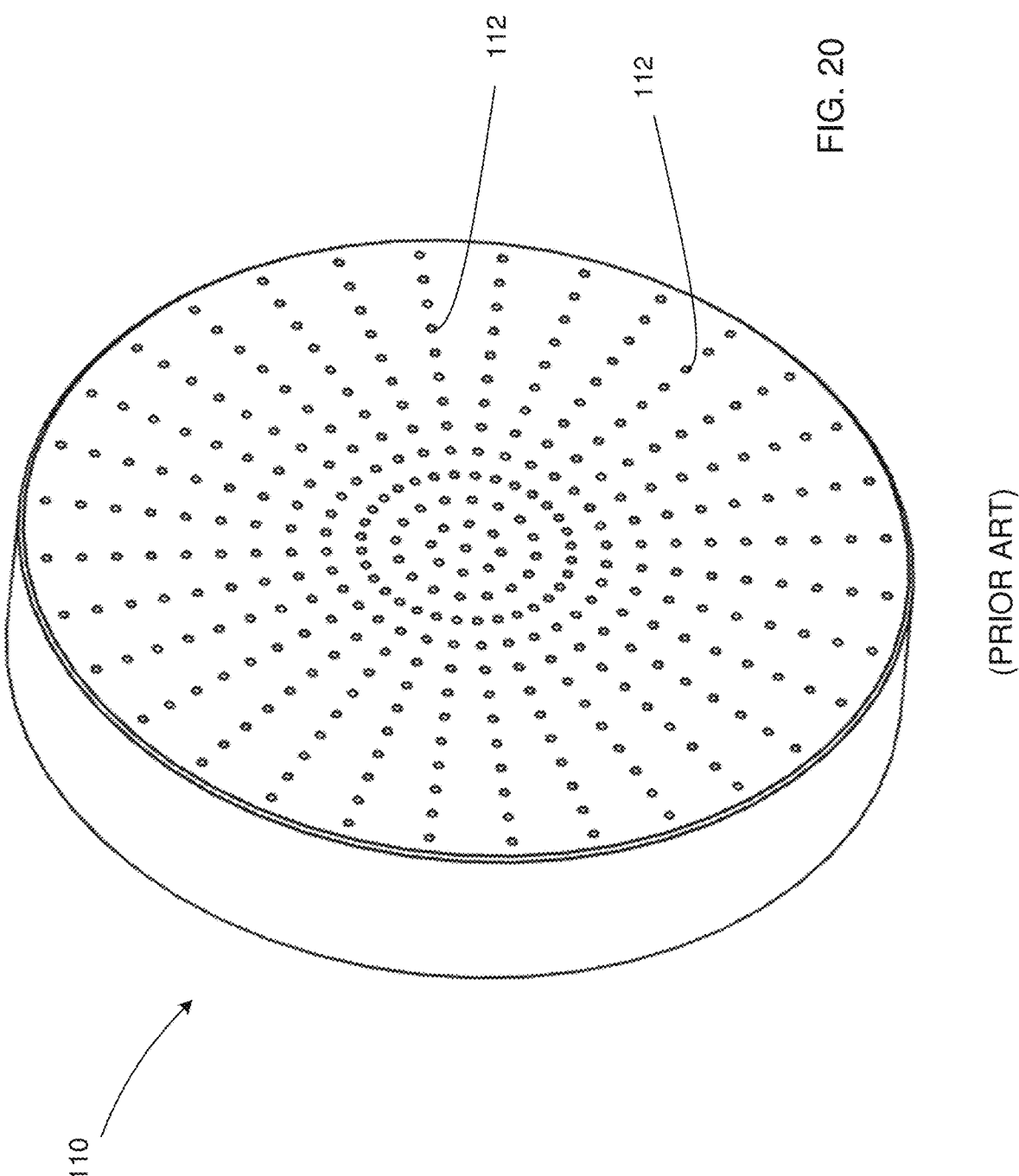
FIG. 20 is a perspective view of a disc-shaped tramp filter.
Figure 21:
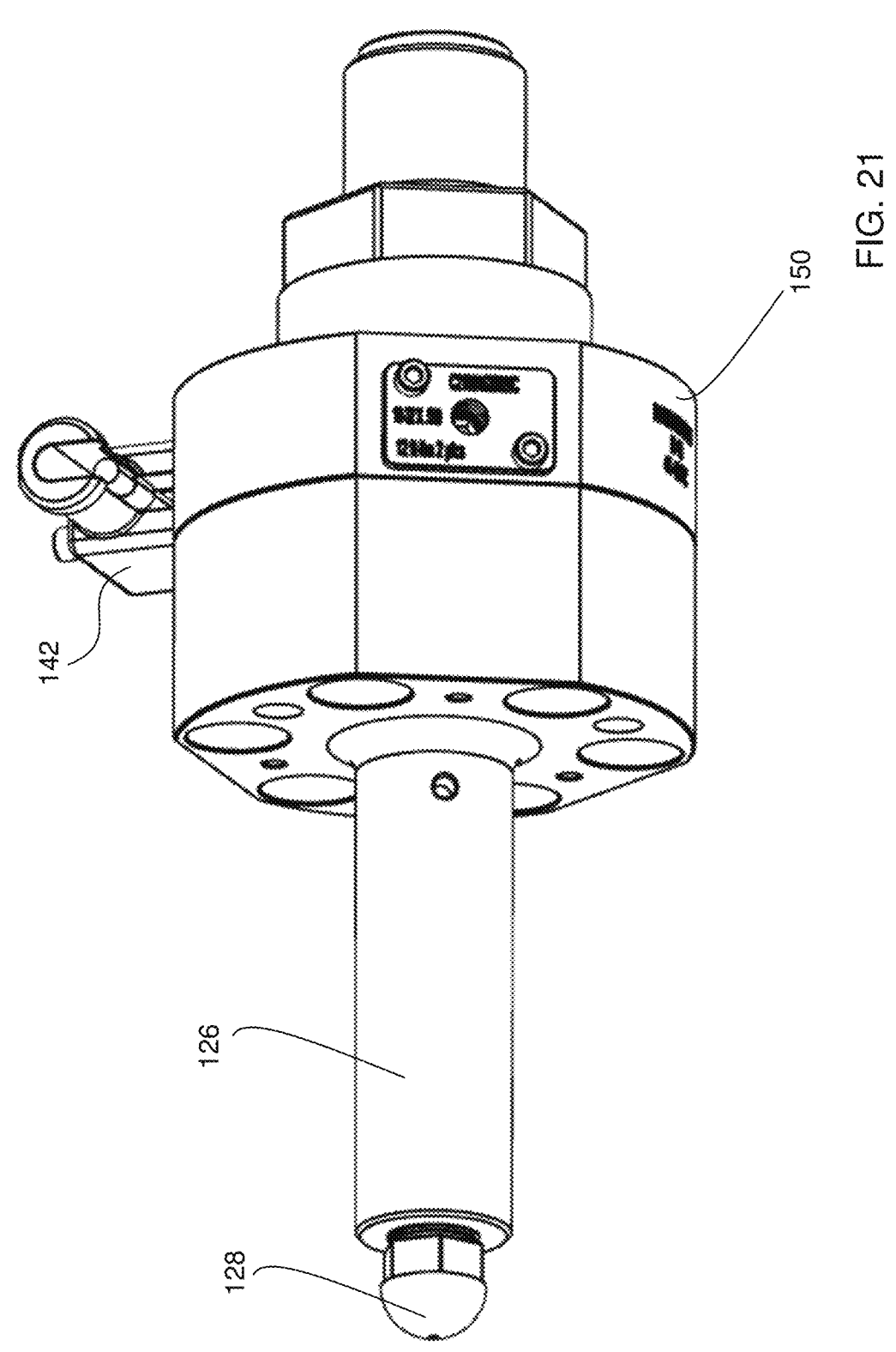
FIG. 21 is a front, right perspective view of a nozzle tip, nozzle body, end cap adapter, and melt pressure transducer mounting assembly, according to a second embodiment of the present disclosure.
Figure 22:
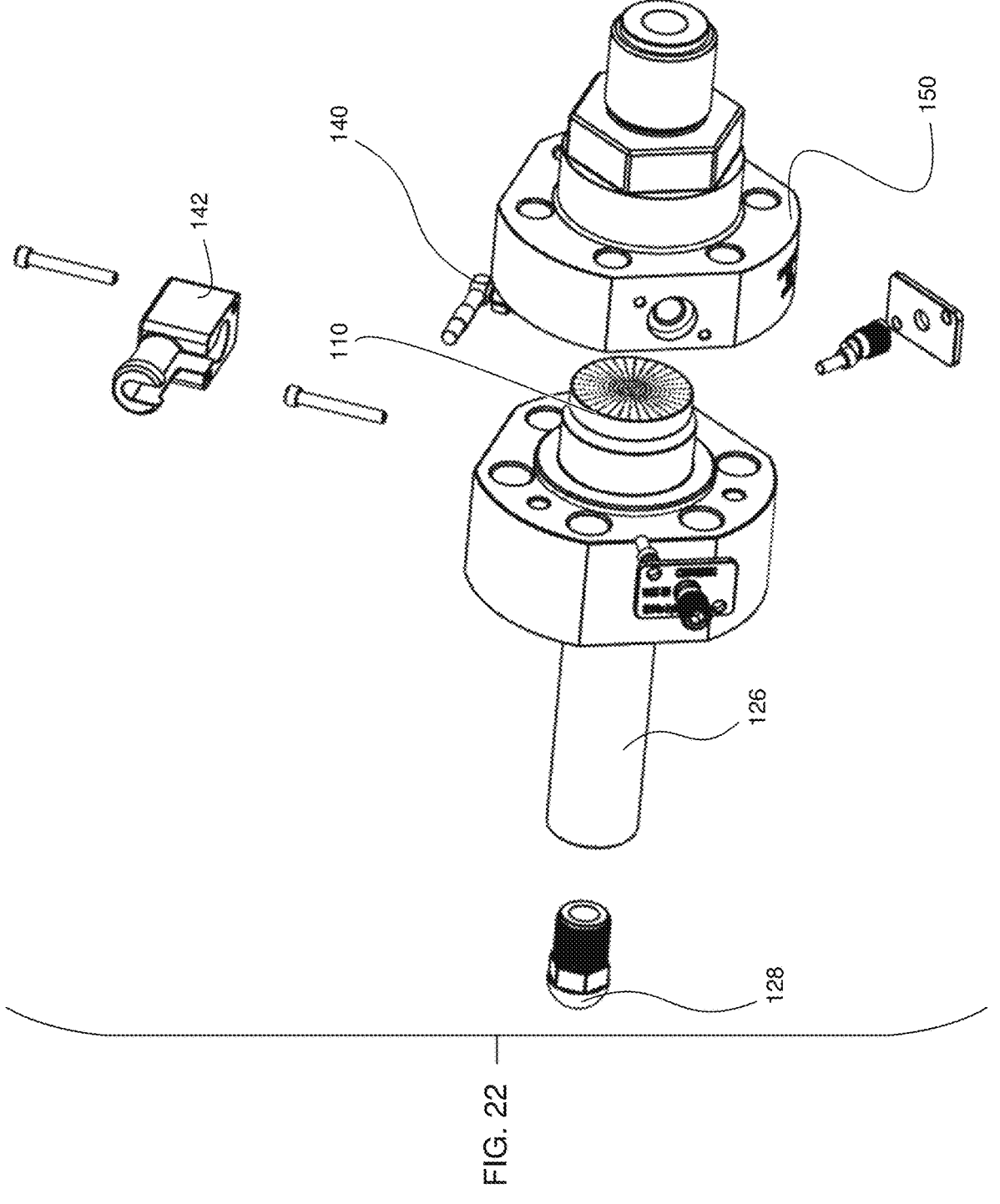
FIG. 22 is an exploded view of the nozzle tip, nozzle body, end cap adapter, and melt pressure transducer mounting assembly of FIG. 21.
Figure 23:
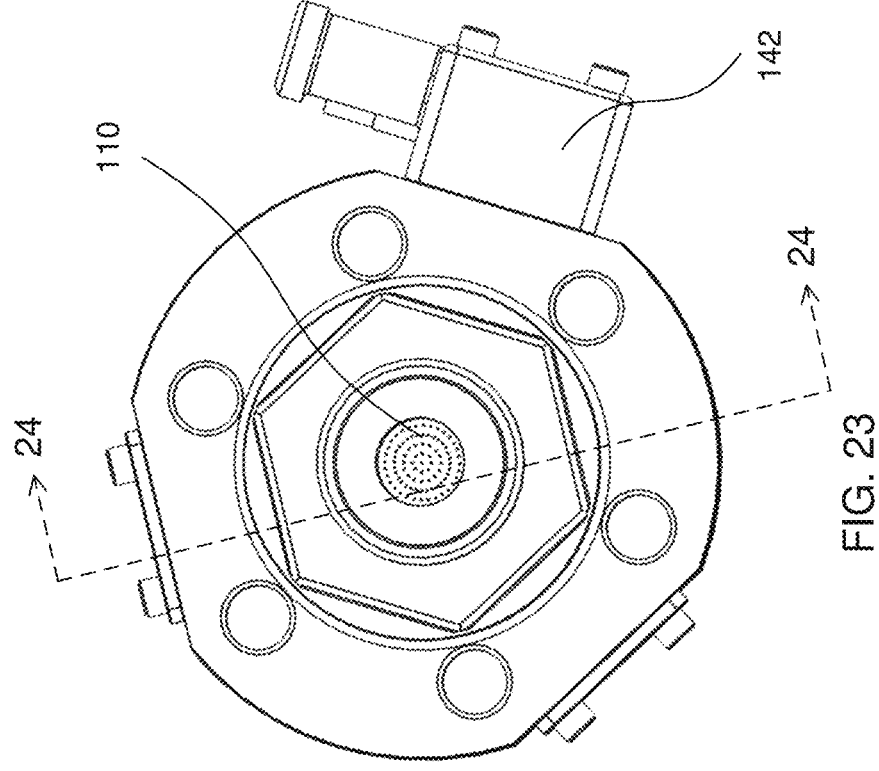
FIG. 23 is a rear view of the disc-shaped tramp filter of FIG. 20 in combination with the end cap adapter, and melt pressure transducer mounting assembly of FIG. 21.
Figure 24:
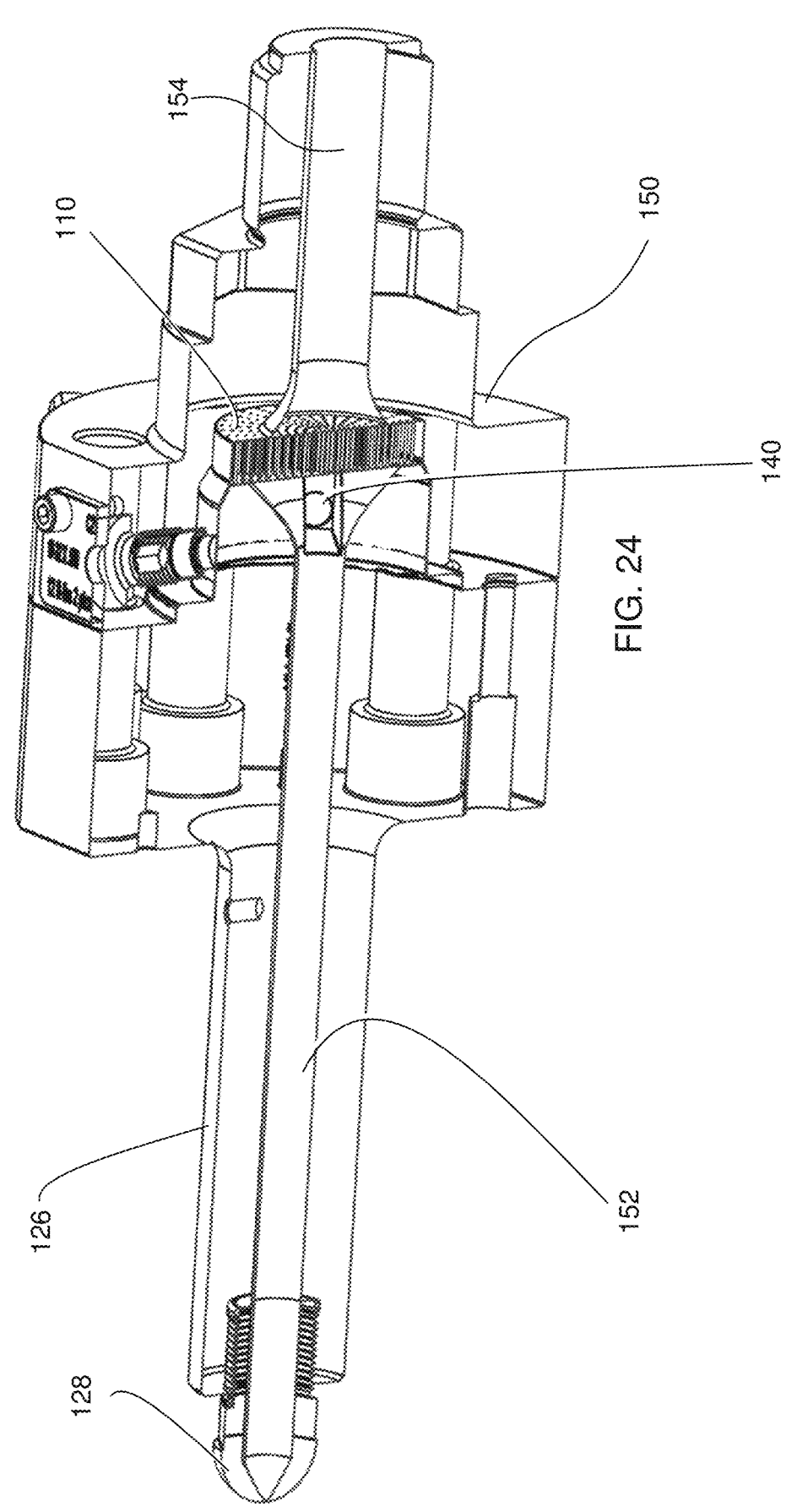
FIG. 24 is a cross-sectional view taken along lines 24-24 of FIG. 23, with the cutting plane and interior of the nozzle tip, nozzle body, end cap adapter, disc-shaped tramp filter, and melt pressure transducer mounting assembly transparent for purposes of illustration only.

Referring to FIG. 1, a conventional linear edge nozzle filter 10 is illustrated. A linear edge nozzle filter 10 features a first plurality of flutes or grooves 12, which may be referred to herein as entrance grooves 12, each provided with a rear (upstream-facing) open end or port 14, and a closed opposite (downstream) end 16. The linear edge nozzle filter 10 further features a second plurality of flutes or grooves 18, which may be referred to herein as exit grooves 18, each provided with a front (downstream-facing) open end or port 20, and a closed opposite (upstream) end 22. The entrance grooves 12 of the first plurality and the exit grooves 18 of the second plurality alternate with one another, and each of the grooves 12, 18 is separated from its adjacent grooves 18, 12 by filter walls 24. A clearance C (see FIG. 13) between the top of each of the filter walls 24 and an interior diameter of a filter-receiving bore 25 of a nozzle body, which is in a range from 0.005" to 0.050", and may, by way of example, be 0.005", 0.010", 0.015", 0.020", 0.025", 0.030", 0.035", 0.040", 0.045", or 0.050", serves as a filtering slit, preventing any particulates, debris, unmelted pellets, or inconsistencies in melt introduced from a barrel upstream of the linear edge nozzle filter 10 larger than the filtering slits from passing from any of the rear-ported, or upstream-open first plurality of grooves 12, into any of the front-ported, downstream-open second plurality of grooves 18.

As indicated by the dot-dot-dashed, arrow-headed lines in FIG. 1 (representing possible melt flowpaths), the melt passes from a direction upstream of the linear edge nozzle filter 10, into the first plurality of grooves 12, then passes through the filtering slits defined by the clearance between the interior diameter of the filter-receiving bore 25 of a nozzle body 26 (see FIG. 13) and the tops of the filter walls 24, and into the second plurality of grooves 18, free to then pass out a downstream end of the linear edge nozzle filter 10 through the open ends or ports 20 at the front end of the linear edge nozzle filter 10.

Figure 2:
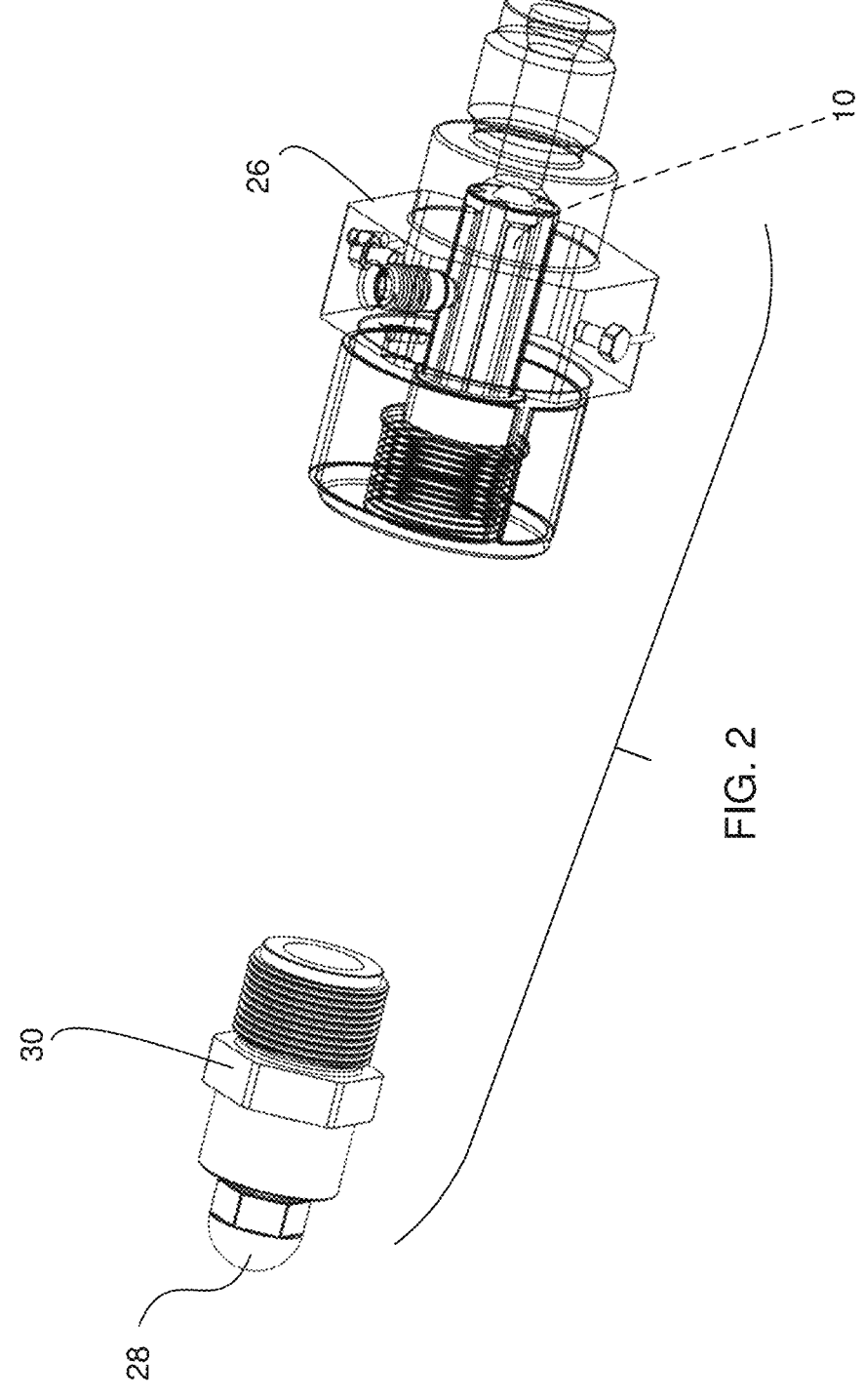
FIG. 2 is a partially-exploded right, top, rear perspective view of a combination of the linear edge nozzle filter of FIG. 1, positioned within a nozzle body having a melt pressure transducer mounted with a sensor tip thereof in fluid communication with a front-ported groove or flute of the linear edge nozzle filter, according to a first embodiment of the present disclosure.
Figure 3:
FIG. 3 is a left, top, front perspective view of the combination of the linear edge nozzle filter and nozzle body of FIG. 2.
Figures 4, 5, 6, 7, 8:
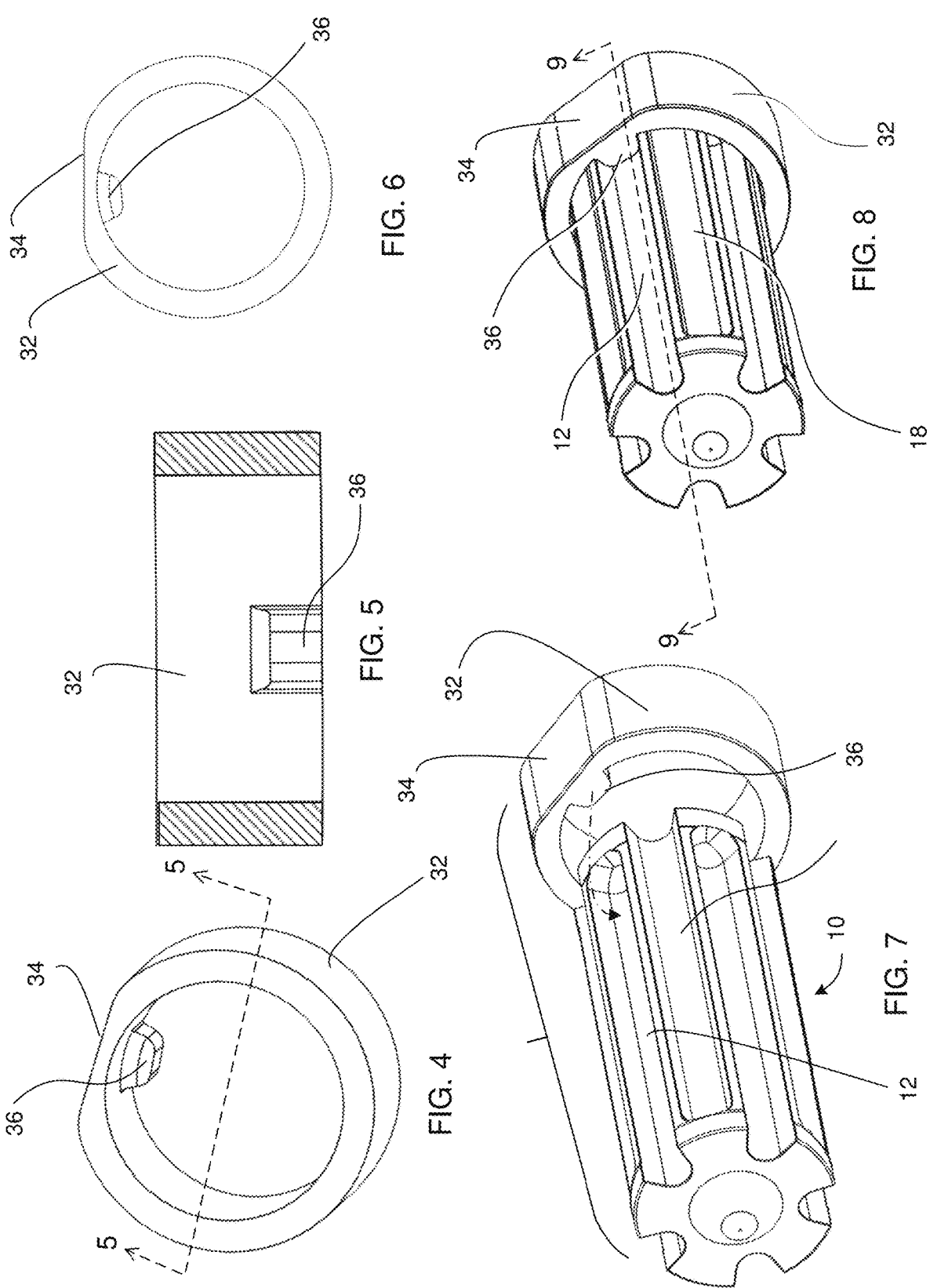
FIG. 4 is a rear, bottom, left perspective view of a locating washer provided to secure the linear edge nozzle filter of FIG. 1 in a desired orientation relative to the nozzle body of FIGS. 2 and 3.
FIG. 5 is a cross-sectional view of the locating washer illustrated in FIG. 4, taken along lines 5-5 of FIG. 4.
FIG. 6 is a front plan view of the locating washer illustrated in FIG. 4.
FIG. 7 is a left, rear, top exploded view of the linear edge nozzle filter illustrated in FIG. 1 and the locating washer illustrated in FIG. 4.
FIG. 8 is a left, rear, top perspective view of the linear edge nozzle filter illustrated in FIG. 1 and the locating washer illustrated in FIG. 4.
Figures 9, 10, 11, 12:
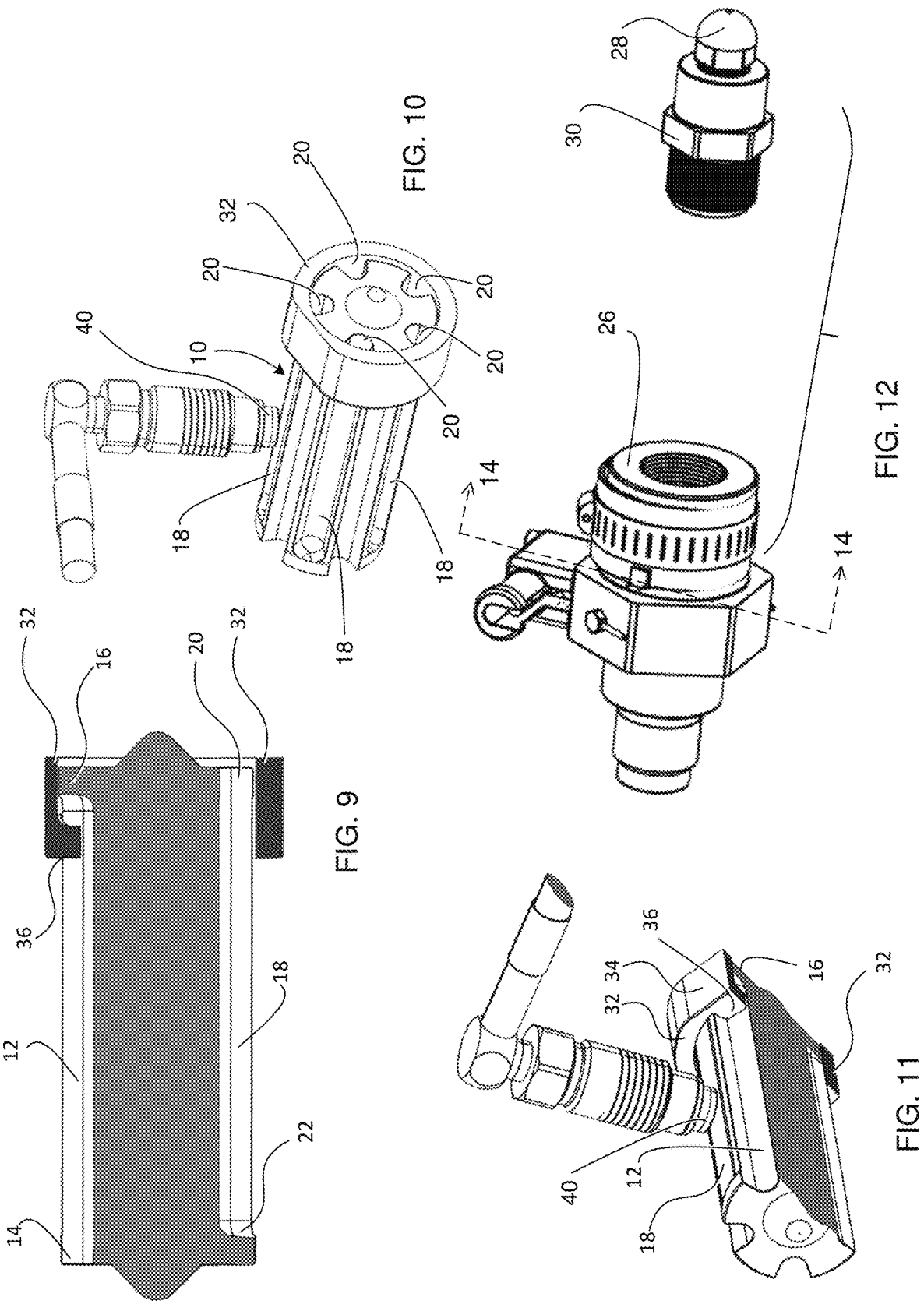
FIG. 9 is a cross-sectional view of the linear edge nozzle filter illustrated in FIG. 1 and the locating washer illustrated in FIG. 4 taken along the lines 9-9 of FIG. 8.
FIG. 10 is a front, right, top perspective view of the linear edge nozzle filter illustrated in FIG. 1 and the locating washer illustrated in FIG. 4, in combination with a melt pressure transducer mounting assembly positioned over a front-ported groove or flute of the linear edge nozzle filter.
FIG. 11 is a rear, left, top perspective view of the linear edge nozzle filter illustrated in FIG. 1, the locating washer illustrated in FIG. 4, and the melt pressure transducer mounting assembly positioned over a front-ported groove or flute of the linear edge nozzle filter.
FIG. 12 is an exploded view of a nozzle tip, a filter cap, a nozzle body, and melt pressure transducer mounting assembly.

FIG. 2 illustrates the linear edge nozzle filter 10 received in a complementary filter-receiving bore of a nozzle body 26. A nozzle tip 28 is received in a filter cap 30, which can be threadedly received within a downstream end of the nozzle body 26, placing the open ends or ports 20 at the front end of the linear edge nozzle filter 10, and therefore the second plurality of grooves 18, in fluid communication with the nozzle tip 28. In order to assure the proper orientation of the linear edge nozzle filter 10, as illustrated in FIGS. 3-18, a locating washer 32 is provided. The locating washer 32 has at least one non-circular (e.g., flat) region 34 along its outer perimeter, and an axially inwardly-directed tab 36 having a geometry that complements the grooves 12, 18 of the linear edge nozzle filter 10. For instance, each (or at least one) of the grooves 12, 18 may have an arc-like, bell-shaped cross-section, and the inwardly-directed tab 36 of the locating washer 32 is provided with a flattened bell-shaped cross-section that fits in one of the grooves, such as one of the entrance grooves 12, thereby preventing the linear edge nozzle filter 10 from rotating relative to the locating washer 32.

By so constraining the linear edge nozzle filter 10 from rotating relative to the locating washer 32, it can be assured that a pressure sensor, such as a melt pressure transducer 40 secured in a melt pressure transducer mounting assembly, which may include a protective melt pressure transducer shroud 42 or housing protector, can maintain its position in fluid communication with melt flowing through an associated one of the exit grooves 18.

By positioning the melt pressure transducer mounting assembly so that a melt pressure sensor 40 provided therein is positioned to sense melt pressure in an exit groove 18, it is assured that data transmitted by the sensor is indicative of actual melt pressure of filtered melt, i.e., after the melt has passed through the filtration slits between the filter walls 24 and an interior wall of a filter bore within which the linear edge nozzle filter 10 is secured. Sensing pressure of filtered melt, downstream of the filtering slits, serves to stabilize the pressure sensor response used in closed-loop plastic processing control systems. In doing so, the closed-loop system response is based on pressure changes in the plastic material flow into the molding cavity without pressure changes, or transient disruptions, from changing conditions in the filter flow due to the accumulation of tramp material or debris. By locating the pressure sensor after the filtering slits, it is possible to achieve and maintain a response time of the control system application of 5 ms (millisecond), or less, to changes in plastic pressure.

In addition to an ability to sense real-time melt pressure downstream of the filtering slits, just before the melt enters the nozzle, the configurations of the present disclosure advantageously facilitate ease of maintenance. For instance, according to this first embodiment, the nozzle tip 28 and filter cap 30 may be disengaged from the nozzle body 26, permitting the linear edge nozzle filter 10 to be withdrawn from a downstream end of the nozzle body 26 through the threaded opening that receives the filter cap 30, without having to dismantle or otherwise disturb the sensitive melt pressure transducer 40. As a benefit of providing the axially inwardly-directed tab 36 of the locating washer 32 at a location relative to the non-circular region 34 that seats within one of the entrance grooves 12 of the linear edge nozzle filter 10, having a closed downstream end 16 and an open rear (upstream-facing) end or port 14, is that (provided the open port 14 is of sufficient dimensions to clear the geometry of the tab 36 of the locating washer 32) the linear edge nozzle filter 10 can be removed from the nozzle body 26 without even having to remove the locating washer 32.

If, however, it is desired to remove both the locating washer 32 and the linear edge nozzle filter 10, still without disturbing the melt pressure transducer 40, one can provide a one or more springs, such as one or more Belleville washer-style springs, between the locating washer 32 and a washer seat 44 within the nozzle body 26.

Turning to FIGS. 20-24, a disc-shaped tramp filter 110 is illustrated. The disc-shaped tramp filter 110 is provided with a multiplicity of filtering apertures 112 in the form of elongate, holes that extend through an axial length of the disc-shaped tramp filter 110. A nozzle body 126 is provided with a nozzle tip 128 at a downstream end thereof. At an upstream end of the nozzle body 126, an end cap adapter 150 is provided. The end cap adapter 150 may be provided with a protective melt pressure transducer shroud 142, in which a melt pressure transducer 140 is received for mounting in such a manner that its sensor tip is in fluid communication with melt entering a bore 152 the nozzle body 126 in a direction toward the nozzle tip 128, and downstream of the disc-shaped tram filter 110. The end cap adapter 150 may be provided with a central bore 154 in fluid communication with a source of melt in a plastic processing control system, such as a heated barrel of an injection molding machine (not shown). In a manner similar to that of the above-described embodiment, melt passes from the source, through the central bore 154 of the end cap adapter 150, enters an upstream side of the disc-shaped tramp filter 110, passing through the filtering apertures 112, with the exception of any particulates, unmelted pellets, debris, or inconsistencies in the melt that are larger than the diameter of the filtering apertures 112, which diameter is in a range from 0.005" to 0.050", and may, by way of example, be 0.005", 0.010", 0.015", 0.020", 0.025", 0.030", 0.035", 0.040", 0.045", or 0.050".

According to the configuration disclosed herein, after the melt exits a downstream side of the disc-shaped tramp filter 110, the melt is in direct fluid communication with a pressure sensor, such as a melt pressure transducer 140, as it passes from the end cap adapter 150 and into the bore 152 of the nozzle body 126 on its way to the nozzle tip 128. By so providing a pressure sensor downstream of the disc-shaped tramp filter 110, it is found that the sensed pressure response is stabilized, relative to conventional pressure sensors that are either in intimate contact with unfiltered melt, or that provide proxy pressure readings based, for example, on load cell readings in the barrel (which is subject to adverse effects of impurities and inconsistencies in the unfiltered melt with which such proxy sensors or in-barrel load cells are in direct or indirect contact).

Also like the above-described embodiment, the configuration of this second embodiment facilitates ease of maintenance, in that it permits the nozzle body 126 to be disconnected from the end cap adapter 150 so as to provide ready access, from a downstream side, to the disc-shaped tramp filter 110, permitting the disc-shaped tramp filter 110 to be removed from a filter-receiving seat within the end cap adapter 150, for cleaning or replacement, without disturbing the mounting of the melt pressure transducer 140. Once a new or cleaned disc-shaped tramp filter 110 is installed, the nozzle body 126 and end cap adapter 150 can then be reconnected, with the melt pressure transducer 140 already positioned so as to be in direct communication with melt on a downstream side of the disc-shaped tramp filter 110.

While various embodiments have been described herein, it will be understood that that modifications can be made thereto that are still considered within the scope of the present disclosure and appended claims.

The invention claimed is:

1. A molten material processing control system comprising:

a source of molten material;

a nozzle body having a nozzle tip at a downstream end thereof;

a filter intermediate the source of molten material and the nozzle tip, wherein the filter is a linear edge nozzle filter received in a bore of the nozzle body;

a pressure sensor provided to sense only molten material that has passed through the filter; and a locating washer disposed in a washer seat of the nozzle body, the locating washer including an axially inwardly-directed tab received in a groove of the linear edge nozzle filter, constraining the linear edge nozzle filter against rotation relative to the pressure sensor.

2. The molten material processing control system of claim 1, wherein the pressure sensor is disposed downstream of at least one filtering aperture of the filter.

3. The molten material processing control system of claim 1, wherein the pressure sensor is in fluid communication with an exit groove of the linear edge nozzle filter.

4. The molten material processing control system of claim 1, wherein the pressure sensor is a melt pressure transducer.

5. The molten material processing control system of claim 1, wherein the filter is a disc-shaped tramp filter.

6. The molten material processing control system of claim 5, wherein the pressure sensor is disposed downstream of the disc-shaped tramp filter.

7. The molten material processing control system of claim 5, wherein the pressure sensor is a melt pressure transducer.

\* \* \* \* \*